(12) United States Patent
Hsu

(10) Patent No.: US 9,841,050 B2
(45) Date of Patent: Dec. 12, 2017

(54) CONNECTION DEVICE APPLICABLE TO FLEXIBLE DISPLAY SCREEN

(71) Applicant: FIRST DOME CORPORATION, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 39 days.

(21) Appl. No.: 14/957,808

(22) Filed: Dec. 3, 2015

(65) Prior Publication Data

US 2017/0064844 A1 Mar. 2, 2017

(30) Foreign Application Priority Data

Aug. 25, 2015 (TW) .............................. 104213705 U

(51) Int. Cl.
*F16B 2/22* (2006.01)
*F16C 11/04* (2006.01)
(Continued)

(52) U.S. Cl.
CPC ................ *F16C 11/04* (2013.01); *F16B 2/22* (2013.01); *G02F 1/13* (2013.01); *G06F 1/1652* (2013.01);
(Continued)

(58) Field of Classification Search
CPC ..... Y10T 403/32016; Y10T 403/32081; Y10T 403/32606; Y10T 403/32622; Y10T 403/3906; Y10T 403/45; Y10T 403/54; F16B 5/0036; F16B 5/004; F16B 5/0048; F16B 5/0621; F16B 5/0064; F16B 5/008; F16B 5/0084; F16B 5/0664; F16B 2/22; F16B 2/24; F16B 2/241; G06F 1/1652; H05K 5/0017
(Continued)

(56) References Cited

U.S. PATENT DOCUMENTS

| 5,078,530 A | * | 1/1992 | Kim ......................... E04D 3/366 403/24 |
| 8,567,591 B2 | * | 10/2013 | Gonzalez Alemany ................ B66B 23/00 198/324 |

(Continued)

FOREIGN PATENT DOCUMENTS

JP 2753201 B2 * 5/1998 ............. B26C 53/78

*Primary Examiner* — Judy Swann
*Assistant Examiner* — Cory B Siegert
(74) *Attorney, Agent, or Firm* — Rosenberg, Klein & Lee

(57) ABSTRACT

A connection device applicable to flexible display screen includes a joint assembly composed of main joints and subsidiary joints. Each main joint has a base section and a first arm and a second arm. The base section and the first and second arms define a first chamber, a first opening and a second chamber and a second opening. Each subsidiary joint has a connection section assembled with the flexible display screen and a first hand section and a second hand section extending from two ends of the connection section. The first and second hand sections respectively extend into the first and second chambers of two adjacent main joints and latch therewith. When an operator operates and opens/closes the display screen, the subsidiary joints relatively move within the first and second chambers of the main joints to drive the main joints to move.

14 Claims, 6 Drawing Sheets

(51) Int. Cl.
  *G02F 1/13* (2006.01)
  *H05K 5/00* (2006.01)
  *G06F 1/16* (2006.01)
(52) U.S. Cl.
  CPC ..... *H05K 5/0017* (2013.01); *Y10T 403/32016* (2015.01)
(58) Field of Classification Search
  USPC ............ 403/54, 62, 119, 121, 180, 220, 291
  See application file for complete search history.

(56) References Cited

U.S. PATENT DOCUMENTS

| | | | |
|---|---|---|---|
| 2014/0240906 A1* | 8/2014 | Seo ........................ | A47B 81/06 361/679.01 |
| 2015/0062840 A1* | 3/2015 | Kim ...................... | G06F 1/1652 361/749 |
| 2016/0077548 A1* | 3/2016 | Lim ........................ | G06F 1/166 361/679.26 |

* cited by examiner

CONNECTION DEVICE APPLICABLE TO FLEXIBLE DISPLAY SCREEN

BACKGROUND OF THE INVENTION

1. Field of the Invention

The present invention relates generally to a connection device applicable to flexible display screen. The connection device is for assembling with an electronic apparatus, including a joint assembly composed of multiple main joints and multiple subsidiary joints. The joint assembly is relatively movable in adaptation to the operation of the electronic apparatus.

2. Description of the Related Art

There are various electronic apparatuses provided with covers or display screens, such as mobile phones, notebooks, PDA, digital image capturing devices and electronic books. The covers, display screens or viewers are pivotally mounted on the electronic apparatuses via pivot pins or rotary shafts, whereby the covers or display screens can be freely rotated and opened/closed under external force.

In order to operate the display module (such as the screen) and/or the apparatus body module of the electronic apparatus in more operation modes and application ranges, a conventional dual-shaft mechanism mounted between the display module and the apparatus body module has been developed to rotate the display module and/or the apparatus body module by different angles in accordance with different operation modes. For example, U.S. Pat. No. 7,512,426 B2 discloses a mobile communications device with synchronizing hinge.

With respect to the operation, motion and structural design of these pivot pins or hinge devices, the conventional pivot pin device cannot be mounted on a flexible display screen or display module in adaptation to the flexion and rotation of the flexible screen. This is because:

1. In the case that the conventional pivot pin device or rotary shaft is applied to a flexible display screen, the rotary shaft will be relatively positioned on outer face (or outer end face) of the display screen, while the display screen is relatively positioned on the inner (end) face of the rotary shaft. There is a certain distance between the display screen and the axis of the rotary shaft. Therefore, when the display screen is flexed with the axis of the rotary shaft positioned on relative outer end serving as the rotational fulcrum, the display screen on the inner face of the rotary shaft will be squeezed and crimped. This is not what we expect.
2. When the existent rotary shaft or pivot pin device is applied to a flexible display screen, the flexible display screen cannot be immediately truly located after flexed or opened/closed.
3. When the hinge device is applied to and connected with the flexible display screen, it must be ensured that the flexible display screen is not pressed and folded or damaged due to too large flexion angle or improper operation of a user. Therefore, the hinge device should keep every part of the flexible display screen as uniformly forced as possible.

The conventional rotary shaft and the relevant connection components thereof have some shortcomings in use and structural design that need to be overcome. It is therefore tried by the applicant to provide a connection device applicable to flexible display module to change the use form, widen the application range and facilitate the operation of the conventional rotary shaft and thus eliminate the shortcomings existing in the conventional rotary shaft. Especially, in condition of simple structural design and simple operation, the connection device is applicable to an electronic apparatus with flexible display screen or display module instead of the conventional rotary shaft or the relevant connection components to solve the problems of the conventional rotary shaft (that when the display screen is flexed or rotated around the rotary shaft, the display screen will be squeezed and crimped and the flexible display screen cannot be truly located). Also, the connection device can ensure that the flexible display screen is not pressed and folded or damaged due to too large flexion angle or improper operation of a user and keep every part of the flexible display screen as uniformly forced as possible. In addition, a frictional interference system is further provided to enhance the locating or fixing effect of the connection device in operation.

SUMMARY OF THE INVENTION

It is therefore a primary object of the present invention to provide a connection device applicable to flexible display screen. The connection device includes a joint assembly composed of main joints and subsidiary joints. The joint assembly is defined with main sections (or referred to as middle sections), motional axes positioned in the main sections, top sections positioned on the main sections and rotational axes positioned between each two adjacent subsidiary joints (top sections).

In the above connection device applicable to flexible display screen, each main joint has a base section positioned in the top section and a first (elastic) arm and a second (elastic) arm connected with two ends of the base section (or two ends of the main section). The first and second arms respectively define a first chamber and a second chamber positioned in the main section. Cantilevers protrude from the base section. Ahead section is formed on each cantilever. The head section and the first and second arms respectively define a first opening in communication with the first chamber and a second opening in communication with the second chamber. Each subsidiary joint has a connection section positioned in the top section and assembled with a (flexible) display screen and a first (elastic) hand section and a second (elastic) hand section extending from two ends of the connection section (or two ends of the main section) into the first and second chambers of two adjacent main joints in a latched state.

When an operator operates and opens/closes the display screen, every subsidiary joint will rotate about a rotational fulcrum in a position between the connection sections (or top sections) of each two adjacent subsidiary joints as the above-defined rotational axis. The first and second hand sections of the subsidiary joint are forced to serve as the above-defined motional axes and relatively move within the main sections (or the first and second chambers) of the main joints. At this time, the main joints are driven to move away from each other to define a gap between each two adjacent main joints. This improves the shortcoming of the conventional hinge device that the pivot shaft structure cannot be truly moved in adaptation to the (bending) operation of the display screen.

In the above connection device applicable to flexible display screen, with a (transverse or horizontal) reference axis as a standard, the first arm of the main joint and the second arm of another main joint are adjacent to each other. The first hand section of the subsidiary joint is adjacent to the second hand section of another subsidiary joint.

In the above connection device applicable to flexible display screen, the head section of the main joint has an arched face and a first interference section and a second interference section positioned on the arched face. The first interference section and the first arm define the width of the first opening, while the second interference section and the second arm define the width of the second opening. When the display screen is positioned in the open position, the first and second interference sections of the main joints respectively interfere with the first and second hand sections of the subsidiary joints. The position where the first and second hand sections interfere with the first and second interference sections is defined as a first position of the first and second hand sections. When an operator operates and closes the display screen from the open position to the closed position, the first hand section of the subsidiary joint is forced to pass over the first interference section to (totally) enter the first chamber and the second hand section is forced to pass over the second interference section to (totally) enter the second chamber so as to achieve a locating effect. The position where the first and second hand sections totally enter the first and second chambers is defined as a second position of the first and second hand sections.

In the above connection device applicable to flexible display screen, in response to the bending operation of the display screen, every main joint and every subsidiary joint are movable to force the first and second hand sections of the subsidiary joints to displace between the first and second position and drive the main joints to relatively move and together form an opening/closing system. Therefore, the total (bending) motional amount of the display screen is uniformly distributed to the displacement of every main joint and every subsidiary joint. In this case, the connection device is able to ensure that every position of the flexible display screen is kept uniformly forced.

The present invention can be best understood through the following description and accompanying drawings, wherein:

DETAILED DESCRIPTION OF THE PREFERRED EMBODIMENTS

Figure 1:
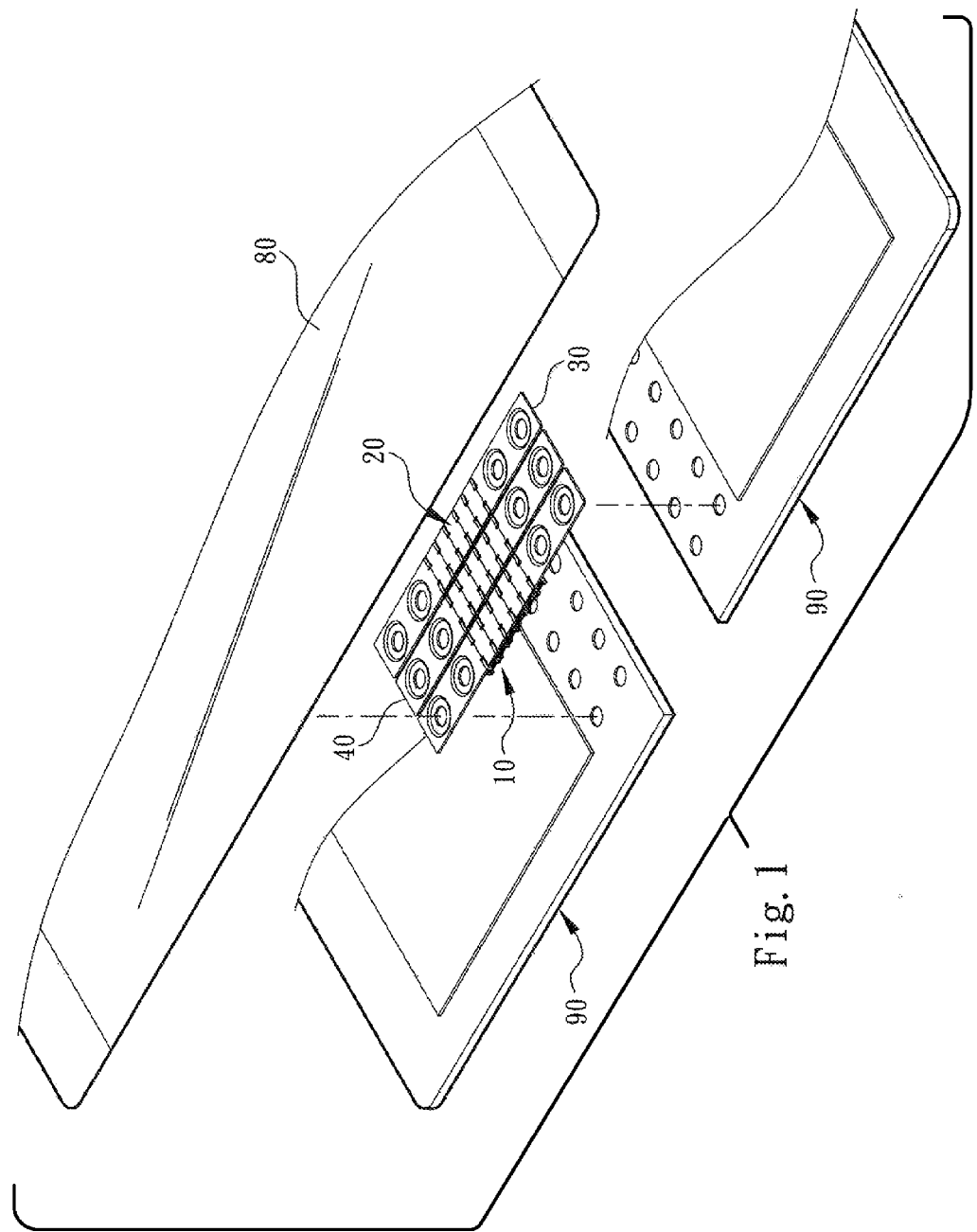
FIG. 1 is a perspective view of the connection device of the present invention, showing that the connection device is applied to a flexible display screen.
Figure 2:
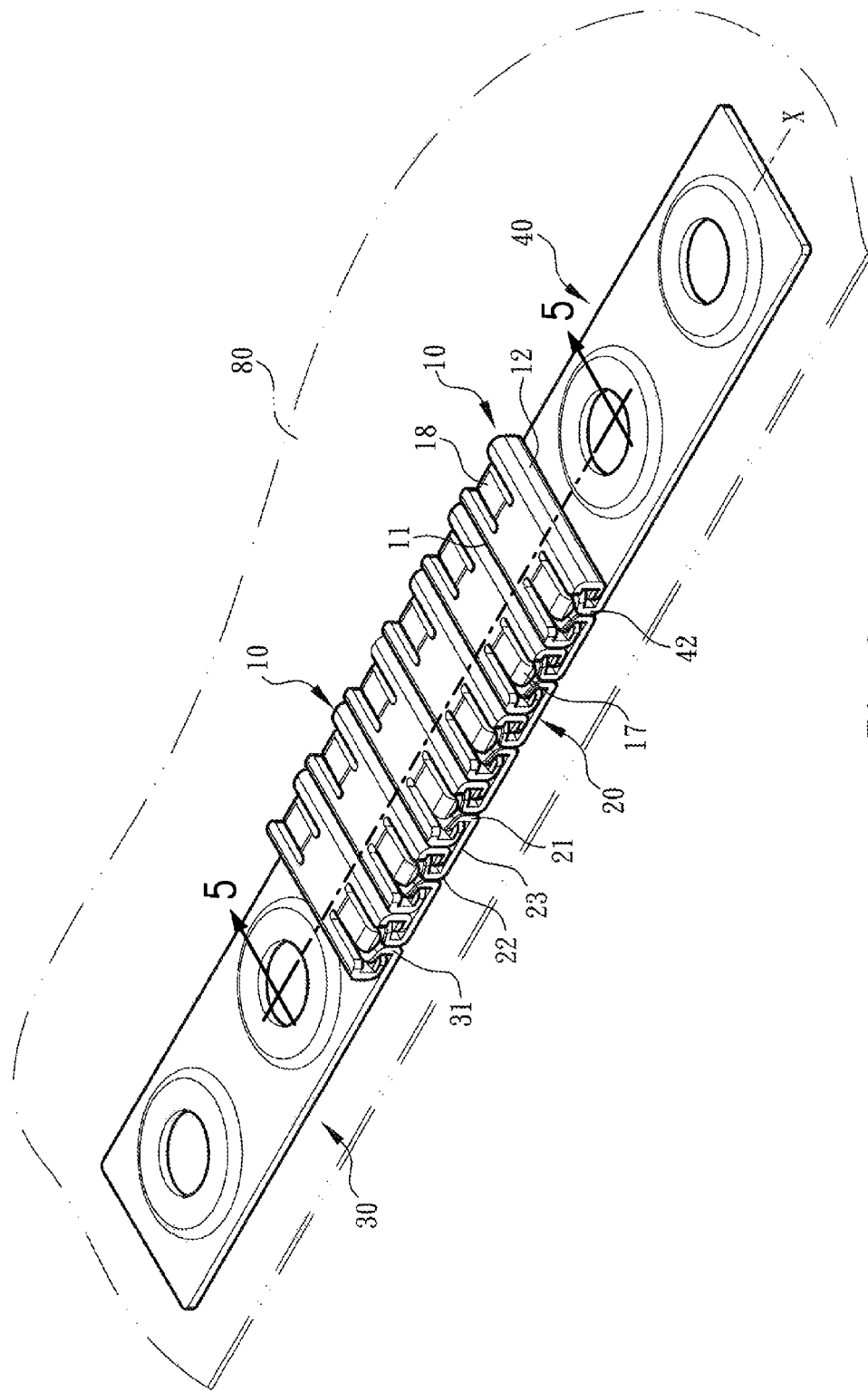
FIG. 2 is a perspective assembled view of the connection device of the present invention, showing that the connection device is composed of multiple main joints and multiple subsidiary joints in cooperation with each other, in which the phantom lines show the positional relationship between the connection device and the flexible display screen.
Figure 3:
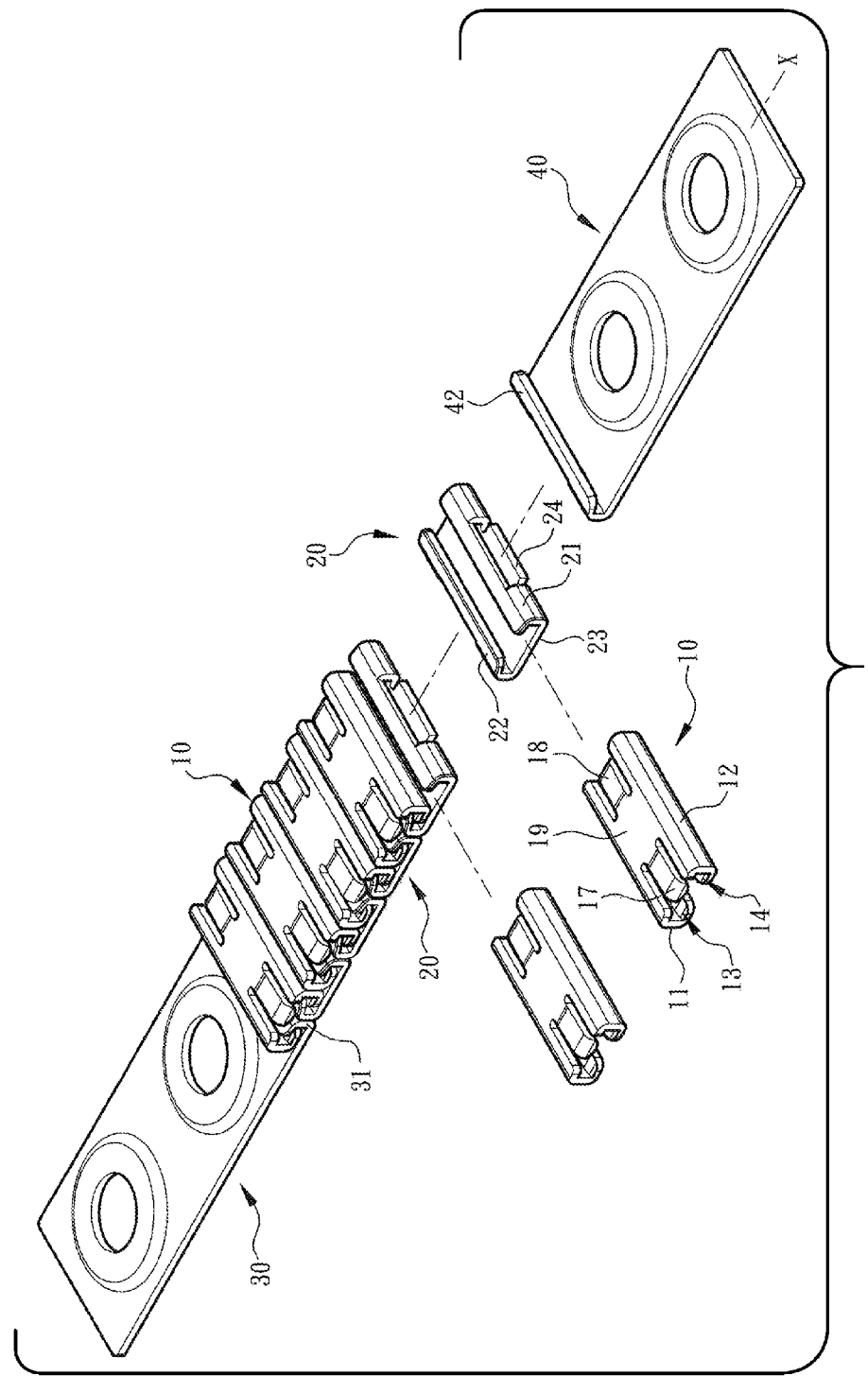
FIG. 3 is a perspective exploded view of the connection device of the present invention according to FIG. 2, showing the structures of the main joints, the subsidiary joints and the pivotal connection boards.

Please refer to FIGS. 1, 2 and 3. The connection device applicable to flexible display screen of the present invention includes a joint assembly composed of (multiple) main joints 10 and (multiple) subsidiary joints 20. The joint assembly is defined with main sections (or referred to as middle sections), two ends of the main sections, motional axes positioned in the main sections, top sections positioned on the main sections and rotational axes positioned between each two adjacent subsidiary joints 20 (top sections). In order to facilitate the illustration, the virtual motional axis is denoted by reference alphabet A or B and the virtual rotational axis is denoted by reference alphabet C.

As shown in the drawings, the main joints 10 and the subsidiary joints 20 have the form of plate body. The main joints 10 and the subsidiary joints 20 are latched with each other to together form the connection device. The connection device further includes a first pivotal connection board 30 having a first hook section 31 and wing section 35 and a second pivotal connection board 40 having a second hook section 42 and wing section 44. The first and second pivotal connection boards 30, 40 serve to help in assembling the connect ion device with an electronic apparatus 90 and display screen 80 in adaptation to the opening/closing operation of the display screen 80.

Basically, the display screen 80 is a common rigid display screen or flexible display screen. In the following embodiment, the display screen 80 is selectively a flexible display screen for illustration purposes only.

Figure 4:
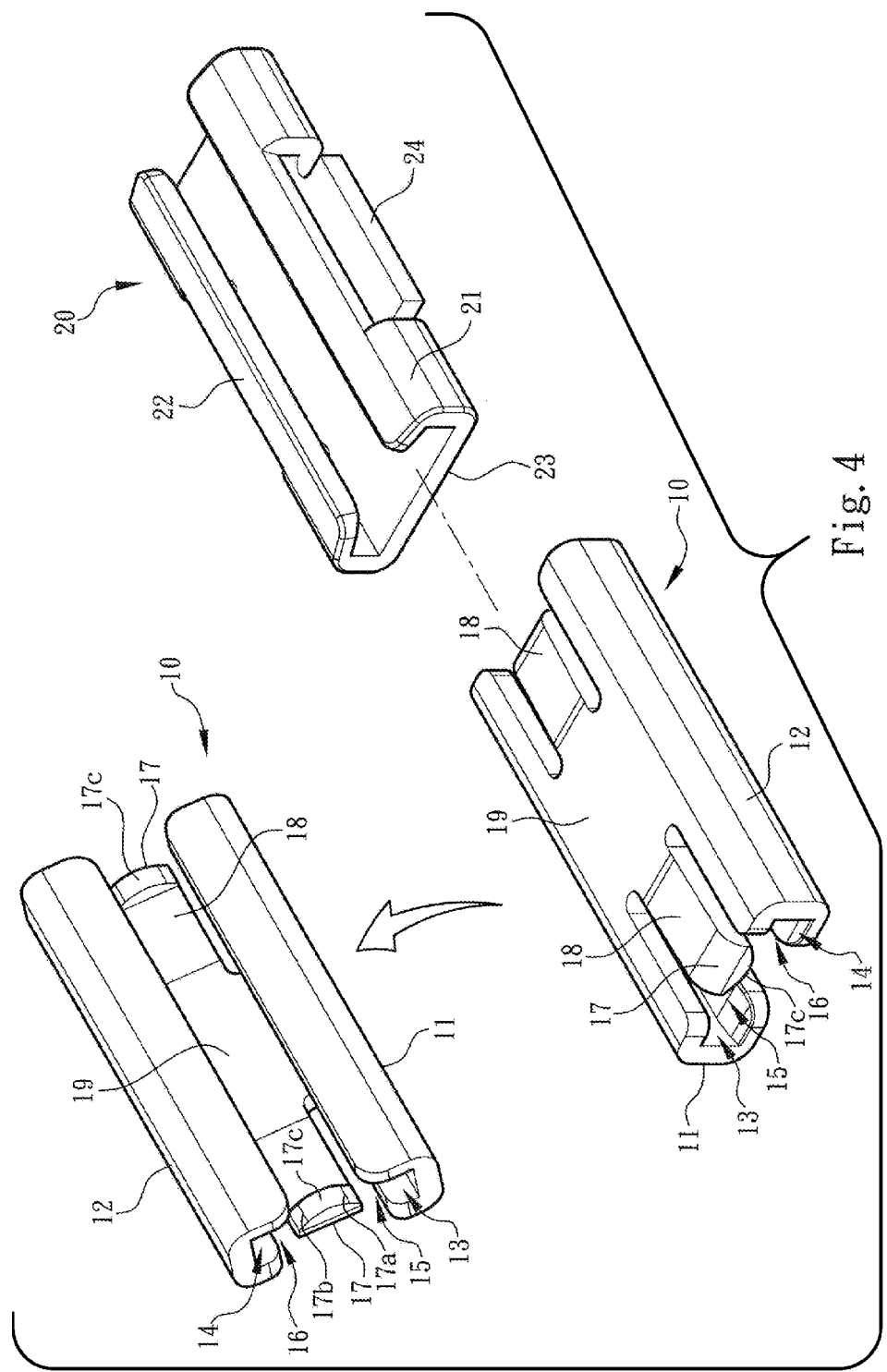
FIG. 4 is an enlarged view of apart of FIG. 3, showing the structures of the main joint and subsidiary joint.
Figure 5:
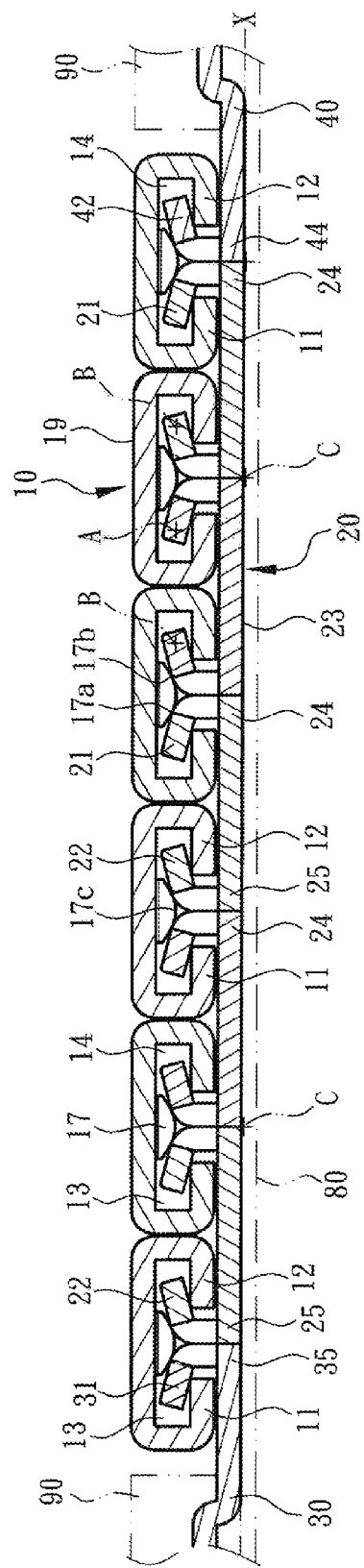
FIG. 5 is a cross-sectional view of the connection device of the present invention taken along the Section line 5-5 of FIG. 2, showing that the connection device is assembled with the flexible display screen and positioned in an open position.

As shown in FIGS. 3, 4 and 5, the main joint 10 has a substantially C-shaped cross section. The main joint 10 has a base section 19 positioned in the top section and a first (elastic) arm 11 and a second (elastic) arm 12 connected with two ends of the base section 19 (or two ends of the main section). The first and second arms 11, 12 are bent to have a C-shaped configuration and define a first chamber 13 and a second chamber 14 positioned in the main section. The first and second chambers 13, 14 serve as an axis guide section. Cantilevers 18 protrude from the front and rear ends of the base section 19 as shown in FIGS. 3 and 4. A head section 17 is formed at a free end of each cantilever 18. The head section 17 and the first and second arms 11, 12 respectively define a first opening 15 in communication with the first chamber 13 and a second opening 16 in communication with the second chamber 14.

Please refer to FIGS. 3, 4 and 5. The subsidiary joint 20 has a substantially C-shaped cross section. The subsidiary joint 20 has a (plane) connection section 23 positioned in the top section and assembled with the display screen 80 and a first (elastic) hand section 21 and a second (elastic) hand section 22 respectively extending from two ends of the connection section 23 (or two ends of the main section) into the first and second chambers 13, 14 of two adjacent main joints 10 in a latched state. In addition, the first and second hand sections 21, 22 interfere with the head sections 17 of the main joint 10.

The motional axes A and B defined above are respectively positioned at the first and second hand sections 21, 22 as shown in FIG. 5. In addition, the subsidiary joint 20 has a first wing section 24 and a second wing section 25 respectively protruding from two sides of the connection section 23 in the positions of the first and second hand sections 21, 22. The first and second wing sections 24, 25 serve as an auxiliary standard face of the side by side arrangement of each two adjacent subsidiary joints 20. The above-defined rotational axes C are positioned between the connection sections 23 or the first and second wing sections 24, 25 of each two adjacent subsidiary joints 20 as shown in FIG. 5.

In this embodiment, the first and second arms 11, 12 are connected with the base section 19 and the cantilevers 18 protrude from the base section 19. Also, the first and second hand sections 21, 22 extend from the connection section 23. According to such structural configuration, the first and second arms 11, 12 and the cantilevers 18 (the head sections 17) and the first and second hand sections 21, 22 have an elastic (motional) effect.

Please refer to FIG. 5, which shows that the display screen 80 and the connection device are positioned in an open position. With a (transverse or horizontal) reference axis X as a standard, the first arm 11 of the main joint 10 and the second arm 12 of another main joint 10 are adjacent to each other. The first hand section 21 and the first wing section 24 of the subsidiary joint 20 are adjacent to the second hand section 22 and the second wing section 25 of another subsidiary joint 20. The first hand section 21 of the subsidiary joint 20 extends into the first chamber 13 of the main joint 10, while the second hand section 22 of the subsidiary joint 20 extends into the second chamber 14 of the other main joint 10 in a latched state.

Also as shown in the drawings, the first hook section 31 and wing section 35 of the first pivotal connection board 30 are adjacent to the second hand section 22 and second wing section 25 of the subsidiary joint 20. The first hook section 31 extends into the first chamber 13 of the main joint 10. The second hook section 42 and wing section 44 of the second pivotal connection board 40 are adjacent to the first hand section 21 and first wing section 24 of the subsidiary joint 20. The second hook section 42 extends into the second chamber 14 of the main joint 10.

In this embodiment, the head section 17 of the main joint 10 has an arched face 17c and a first interference section 17a and a second interference section 17b positioned on the arched face 17c. The first interference section 17a and the first arm 11 define the width of the first opening 15, while the second interference section 17b and the second arm 12 define the width of the second opening 16.

Therefore, referring to FIG. 5, when the display screen 80 is positioned in the open position, the first interference section 17a of the main joint 10 interferes with the first hand section 21 of the subsidiary joint 20 and the second interference section 17b of the main joint 10 interferes with the second hand section 22 of the other subsidiary joint 20. The first hook section 31 of the first pivotal connection board 30 interferes with the first interference section 17a of the main joint 10. The second hook section 42 of the second pivotal board 40 interferes with the second interference section 17b of the other main joint 10. Moreover, the positions of the first and second hand sections 21, 22 and the first and second hook sections 31, 42 in FIG. 5 are defined as a first position.

Figure 6:
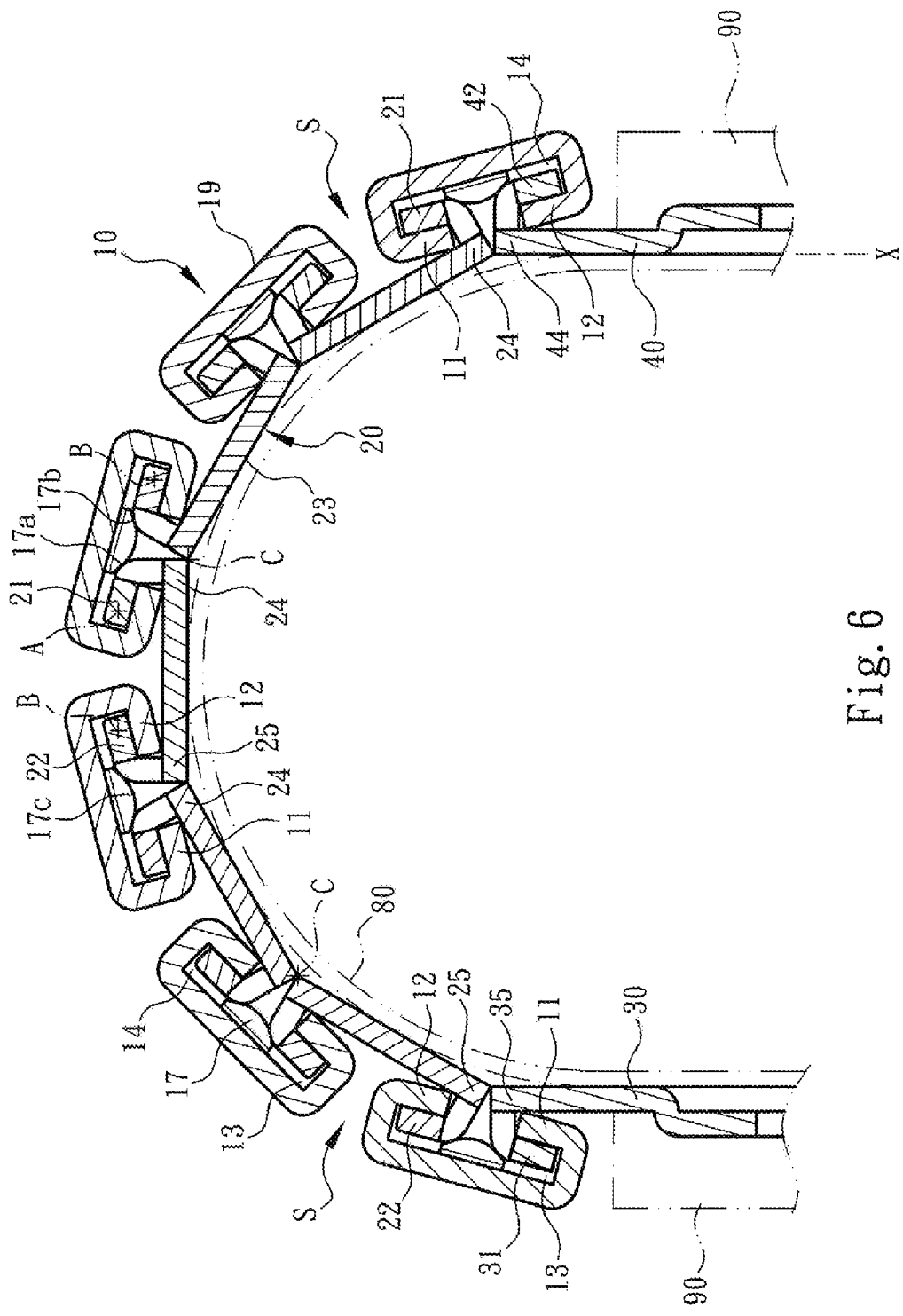
FIG. 6 is a cross-sectional view of the connection device of the present invention taken along the Section line 5-5 of FIG. 2, showing that the flexible display screen is operated and bent from the open position to the closed position and the connection device is bent in adaptation to the operation of the flexible display screen.

Please refer to FIGS. 5 and 6. When an operator operates and bends the display screen 80 from the open position of FIG. 5 to a closed position of FIG. 6, every subsidiary joint 20 will rotate or swing about a rotational or swinging fulcrum in a position where the first wing section 24 of each subsidiary joint 20 is adjacent to the second wing section 25 of the other subsidiary joint 20 (or the wing section 35 of the first pivotal connection section 30 is adjacent to the second wing section 25 of the subsidiary joint 20 and the wing section 44 of the second pivotal connection board 40 is adjacent to the first wing section 24 of the subsidiary joint 20), (that is, the above-defined rotational axes C). At this time, the first and second hand sections 21, 22 of the subsidiary joint 20 are forced to serve as the above-defined motional axes A, B and relatively move within the first and second chambers 13, 14 of the main section of the main joint 10, (that is, the above-defined axis guide section). Accordingly, the main joints 10 are driven to move away from each other to define a gap S between each two adjacent main joints 10.

Also, the first hand section 21 of the subsidiary joint 20 pushes and presses the first arm 11 and the head section 17 of the cantilever of the main joint 10 to elastically expand the same and pass over the first interference section 17a of the main joint 10 to (totally) enter the first chamber 13. The second hand section 22 of the subsidiary joint 20 pushes and presses the second arm 12 and the head section 17 of the cantilever of the main joint 10 to elastically expand the same and pass over the second interference section 17b of the other adjacent main joint 10 to (totally) enter the second chamber 13 of the other adjacent main joint 10. The first hook section 31 of the first pivotal connection board 30 pushes and presses the first arm 11 and the head section 17 of the cantilever of the main joint 10 to elastically expand the same and pass over the first interference section 17a of the main joint 10 to (totally) enter the first chamber 13. The second hook section 42 of the second pivotal connection board 40 pushes and presses the second arm 12 and the head section 17 of the cantilever of the other main joint to elastically expand the same and pass over the second interference section 17b of the other main joint 10 to (totally) enter the second chamber 14 of the other main joint 10 and achieve a locating effect as shown in FIG. 6.

The positions of the first and second hand sections 21, 22 and the first and second hook sections 31, 42 in FIG. 6 are defined as a second position.

It should be noted that when an operator operates the display screen 80 from the closed position to the open position, the first and second hand sections 21, 22 and the first and second hook sections 31, 42 respectively pass through the first and second interference sections 17a, 17b again and frictionally interfere with the first and second interference sections 17a, 17b and the first and second arms 11, 12. Therefore, the connection device and the display screen 80 are operated to the open state.

It must be specified that the connection device includes the following considerations:

1. The connection sections 23 of the subsidiary joints 20 form a nearly plane structure to easily assemble with the display screen 80. Moreover, the first and second wing sections 24, 25 of the subsidiary joints 20 and/or the wing sections 35, 4L of the first and second pivotal connection boards 30, 40 serve as the motional fulcrums.
2. The motional fulcrums and the connection sections 23 are as positioned in the same reference axis X as possible or the motional fulcrums are positioned as close to the connection line of the connection sections 23 as possible. Therefore, the display screen 80 attached to the connection sections 23 is positioned as close to or adjacent to the motional fulcrums as possible.
3. The total motional amount of the display screen 80 is uniformly distributed to the displacement of every subsidiary joint 20 or main joint 10. That is, the total motional amount of the display screen 80 is distributed to the displacement of the first and second hand sections 21, 22 of every subsidiary joint (and/or the first and second hook sections 31, 42) from the first position to the second position. Also, the main joints 10 are relatively moved and the first and second chambers 13, 14 of the main joints 10 restrict the displacement of the first and second hand sections 21, 22 of every subsidiary joint (and/or the first and second hook sections 31, 42).

Therefore, the connection device of the present invention is able to ensure that the display screen 80 will not be pressed and folded or damaged due to excessively large bending angle or improper operation of an operator. Moreover, every subsidiary joint 20 uniformly bears or supports every position of the display screen 80 so that every position of the display screen 80 is kept uniformly forced. In addition, according to the structural design of the connection device of the present invention, when an operator operates the display screen 80 to open the display screen 80 or (bend) and close the display screen 80, the problem of the conventional display module that the display module is often squeezed and crimped is truly improved or solved.

In conclusion, in condition of easy and convenient operation, in comparison with the conventional display module, the connection device applicable to flexible display screen of the present invention has the following advantages:

1. The connection device and the relevant components of the present invention have been redesigned. For example, the main joint 10 has a first arm 11 defining a first chamber 13 and a second arm 12 defining a second chamber 14. The cantilevers 18 protrude from the base section 19. Each cantilever 18 has a head section 17. The head section 17 has an arched face 17c, a first interference section 17a and a second interference section 17b to respectively define a first opening 15 and a second opening 16 with the first and second arms 11, 12. The subsidiary joint 20 has a first hand section 21 and a second hand section 22 extending into the first and second chambers 13, 14 to frictionally interfere with the head section 17. The first and second wing sections 24, 25 of the subsidiary joint 20 serve as the motional fulcrums. During the opening or bending and closing travel of the display screen 80, in response to the operation of an operator to the display screen 80, the first and second hand sections 21, 22 are moved between the first and second positions to drive the main joints 10 to move. The above structural design of the present invention is obviously different from the design of the pivot structure of the conventional electronic apparatus. Also, the power transmission form of the present invention is apparently different from that of the pivot structure of the conventional electronic apparatus.

2. The present invention is technically characterized in that the first and second wing sections 24, 25 of the subsidiary joint 20 serve as the motional fulcrums. This not only saves the rotary shaft structure applied to the conventional electronic apparatus, but also makes the motional fulcrums as attached to the display screen 80 as possible. The connection device of the present invention has different structural design so that the use form of the connection device is changed to be different from the conventional device. Also, in practice, the application range of the connection device is widened so that the connection device is applicable to flexible display screen 80 of electronic apparatus 90. In addition, the connection device of the present invention improves or solves the problem of the conventional display module that the flexible display screen is often squeezed and crimped along with the rotation or bending of the display module about the pivot shaft (to ensure that the flexible display screen will not be pressed and folded or damaged and every position of the flexible display screen is kept uniformly forced).

3. The first and second chambers 13, 14 and the cantilevers 18 and the head sections 17 of the main joints 10 structurally cooperate with the first and second hand sections 21, 22 of the subsidiary joints 20. Accordingly, in response to the bending motion of the display screen 80, the subsidiary joints 20 provide a critical position for the frictional interference. That is, after the first and second hand sections 21, 22 pass over the critical position, the subsidiary joints 20 provide a locating effect as a locating system. Only when an operator applies an operational force to the first and second hand sections 21, 22 to overcome the frictional interference effect of the head sections 17, the first and second hand sections 21, 22 can move back to the first position.

4. Especially, the total motional amount of the display screen 80 is uniformly distributed to the displacement of every subsidiary joint 20. In this case, the connection device of the present invention is able to ensure that the display screen 80 will not be pressed and folded or damaged due to excessively large bending angle or improper operation of an operator. Also, every position of the display screen 80 is kept uniformly forced.

In conclusion, the connection device applicable to flexible display screen of the present invention is different from the conventional pivot shaft structure in space form and is inventive and greatly advanced and advantageous over the conventional pivot shaft structure.

The above embodiments are only used to illustrate the present invention, not intended to limit the scope thereof. Many modifications of the above embodiments can be made without departing from the spirit of the present invention.

What is claimed is:

1. A connection device for a flexible display screen defining a joint assembly, comprising:
   multiple main joints; and
   multiple subsidiary joints, the main and subsidiary joints being positioned in opposing and moving relationship with respect to each other;
   each main joint having a base section, a first arm and a second arm, the first and second arms being connected with two opposing ends of the base section, the first arm configured to have a first chamber positioned therein, the second arm configured to have a second chamber positioned therein and in facing relationship with the first chamber, and at least one resilient cantilever protruding from the base section to be positioned between the first and second arms;
   each subsidiary joint having a connection section and a first hand section extending from one end of the connection section and a second hand section extending from an opposing end of the connection section, each first hand section being displaceably disposed in a respective first chamber of a corresponding main joint and each second hand section being displaceably disposed in a respective second chamber of an adjacent main joint, each first hand section being in contact with the resilient cantilever of the corresponding main joint and each second hand section being in contact with the resilient cantilever of the adjacent main joint;
   wherein each of the first hand sections and the second hand sections is displaceable between a first position and a second position and releasably held thereat by the contact of a respective resilient cantilever with a respective first hand section and a respective second hand section;

wherein each subsidiary joint is rotationally movable about a rotational axis defined between adjacent ones of the multiple subsidiary joints, the adjacent ones of the multiple subsidiary joints being rotationally moved between an open position of the flexible display screen and a closed position of the flexible display screen, the first and second hand sections being in the first position in correspondence with the open position of the flexible display screen and in the second position in correspondence with the closed position of the flexible display screen, and the main joints being disposed in contiguous relationship one to another in the open position of the flexible display screen and angularly displaced from one another about the rotational axis in the closed position of the flexible display screen;

wherein each resilient cantilever has a head section, the head section and the first and second arms of a corresponding main joint defining a respective first opening in communication with the first chamber and a respective second opening in communication with the second chamber, the head section having an arched face and a first interference section and a second interference section positioned on opposing ends of the arched face, the first interference section and the first arm defining a width of the first opening, the second interference section and the second arm defining a width of the second opening;

wherein each subsidiary joint has a first wing section and a second wing section respectively protruding from the opposing ends of the connection section to respectively correspond to positions of the first and second hand sections;

a first pivotal connection board, the first pivotal connection board having a first hook section and a wing section; and a second pivotal connection board, the second pivotal connection board having a second hook section and a wing section;

wherein the first hook section extends into the first chamber of a corresponding main joint located at one end of the joint assembly, and wherein the second hook section extends into the second chamber of a corresponding main joint located at an opposing end of the joint assembly.

2. The connection device for a flexible display screen as claimed in claim 1, wherein the connection section of the subsidiary joint has a planar structure for assembling with the flexible display screen.

3. The connection device for a flexible display screen as claimed in claim 1, wherein the main joint has a C-shaped cross section and the first and second arms have elastic effect, the first and second arms being bent to have a C-shaped configuration, the subsidiary joint having a C-shaped cross section, the first and second hand sections having elastic effect.

4. The connection device for a flexible display screen as claimed in claim 2, wherein the main joint has a C-shaped cross section and the first and second arms have elastic effect, the first and second arms being bent to have a C-shaped configuration, the subsidiary joint having a C-shaped cross section, the first and second hand sections having elastic effect.

5. The connection device for a flexible display screen as claimed in claim 1, wherein the cantilevers protrude from a front end and a rear end of the base section, wherein the head section is formed at a free end of the cantilever, the subsidiary joint having a C-shaped cross section, the first and second hand sections having elastic effect.

6. The connection device for a flexible display screen as claimed in claim 1, wherein the cantilevers protrude from a front end and a rear end of the base section, wherein the head section is formed at a free end of the cantilever.

7. The connection device for a flexible display screen as claimed in claim 1, wherein the first hand section and the first wing section of a corresponding subsidiary joint are contiguous with respect to the second hand section and the second wing section of a corresponding adjacent subsidiary joint, wherein the first hook section and the wing section of the first pivotal connection board are adjacent to the second hand section and the second wing section of a corresponding subsidiary joint;

whereby the position where the wing section of the first pivotal connection board is adjacent to the second wing section of the subsidiary joint serves as a rotational fulcrum, the second hook section and the wing section of the second pivotal connection board being adjacent to the first hand section and the first wing section of a corresponding subsidiary joint, whereby the position where the wing section of the second pivotal connection board is adjacent to the first wing section of the subsidiary joint serves as a rotational fulcrum, the first interference section of the main joint interfering with the first hand section of the subsidiary joint, the second interference section of the main joint interfering with the second hand section of the other subsidiary joint, the first hook section of the first pivotal connection board interfering with the first interference section of the main joint, the second hook section of the second pivotal connection board interfering with the second interference section of the other main joint, the position where the first and second hook sections interfere with the first and second interference sections being defined as a first position of the first and second hook sections.

8. The connection device for a flexible display screen as claimed in claim 2, wherein the first hand section and the first wing section of a corresponding subsidiary joint are contiguous with respect to the second hand section and the second wing section of a corresponding adjacent subsidiary joint, wherein the first hook section and the wing section of the first pivotal connection board are adjacent to the second hand section and the second wing section of a corresponding subsidiary joint;

whereby the position where the wing section of the first pivotal connection board is adjacent to the second wing section of the subsidiary joint serves as a rotational fulcrum, the second hook section and the wing section of the second pivotal connection board being adjacent to the first hand section and the first wing section of a corresponding subsidiary joints;

whereby the position where the wing section of the second pivotal connection board is adjacent to the first wing section of the subsidiary joint serves as a rotational fulcrum, the first interference section of the main joint interfering with the first hand section of the subsidiary joint, the second interference section of the main joint interfering with the second hand section of the other subsidiary joint, the first hook section of the first pivotal connection board interfering with the first interference section of the main joint, the second hook section of the second pivotal connection board interfering with the second interference section of the other main joint, the position where the first and second hook sections interfere with the first and second interference sections being defined as a first position of the first and second hook sections.

9. The connection device for a flexible display screen as claimed in claim 5, wherein the first hand section and the first wing section of a corresponding subsidiary joint are contiguous with respect to the second hand section and the second wing section of a corresponding adjacent subsidiary joint;

whereby the position where the first wing section of the subsidiary joint is adjacent to the second wing section of the other subsidiary joint serves as a rotational fulcrum, the first hook section and the wing section of the first pivotal connection board being adjacent to the second hand section and the second wing section of a corresponding subsidiary joint;

whereby the position where the wing section of the first pivotal connection board is adjacent to the second wing section of the subsidiary joint serves as a rotational fulcrum, the second hook section and the wing section of the second pivotal connection board being adjacent to the first hand section and the first wing section of a corresponding subsidiary joint;

whereby the position where the wing section of the second pivotal connection board is adjacent to the first wing section of the subsidiary joint serves as a rotational fulcrum, the first interference section of the main joint interfering with the first hand section of the subsidiary joint, the second interference section of the main joint interfering with the second hand section of the other subsidiary joint, the first hook section of the first pivotal connection board interfering with the first interference section of the main joint, the second hook section of the second pivotal connection board interfering with the second interference section of the other main joint, the position where the first and second hook sections interfere with the first and second interference sections being defined as a first position of the first and second hook sections.

10. The connection device for a flexible display screen as claimed in claim 6, wherein the first hand section and the first wing section of a corresponding subsidiary joint are contiguous with respect to the second hand section and the second wing section of a corresponding adjacent subsidiary joint;

whereby the position where the first wing section of the subsidiary joint is adjacent to the second wing section of the other subsidiary joint serves as a rotational fulcrum, the first hook section and the wing section of the first pivotal connection board being adjacent to the second hand section and the second wing section of a corresponding subsidiary joint;

whereby the position where the wing section of the first pivotal connection board is adjacent to the second wing section of the subsidiary joint serves as a rotational fulcrum, the second hook section and the wing section of the second pivotal connection board being adjacent to the first hand section and the first wing section of a corresponding subsidiary joint;

whereby the position where the wing section of the second pivotal connection board is adjacent to the first wing section of the subsidiary joint serves as a rotational fulcrum, the first interference section of the main joint interfering with the first hand section of the subsidiary joint, the second interference section of the main joint interfering with the second hand section of the other subsidiary joint, the first hook section of the first pivotal connection board interfering with the first interference section of the main joint, the second hook section of the second pivotal connection board interfering with the second interference section of the other main joint, the position where the first and second hook sections interfere with the first and second interference sections being defined as a first position of the first and second hook sections.

11. The connection device for a flexible display screen as claimed in claim 7, wherein each subsidiary joint drives a corresponding main joint to relatively move and form a gap between each two adjacent main joints, the first hand section of the subsidiary joint pushing and pressing the first arm and the head section of the cantilever of the main joint to elastically expand the same and pass over the first interference section of the main joint to enter the first chamber, the second hand section pushing and pressing the second arm and the head section of the cantilever of the main joint to elastically expand the same and pass over the second interference section of the other adjacent main joint to enter the second chamber of the other adjacent main joint, the first hook section of the first pivotal connection board pushing and pressing the first arm and the head section of the cantilever of the main joint to elastically expand the same and pass over the first interference section of the main joint to totally enter the first chamber, the second hook section of the second pivotal connection board pushing and pressing the second arm and the head section of the cantilever of the other main joint to elastically expand the same and pass over the second interference section of the other main joint to totally enter the second chamber of the other main joint, the position where the first and second hook sections totally enter the first and second chambers being defined as a second position of the first and second hook sections.

12. The connection device for a flexible display screen as claimed in claim 8, wherein each subsidiary joint drives a corresponding main joint to relatively move and form a gap between each two adjacent main joints, the first hand section of the subsidiary joint pushing and pressing the first arm and the head section of the cantilever of the main joint to elastically expand the same and pass over the first interference section of the main joint to enter the first chamber, the second hand section pushing and pressing the second arm and the head section of the cantilever of the main joint to elastically expand the same and pass over the second interference section of the other adjacent main joint to enter the second chamber of the other adjacent main joint, the first hook section of the first pivotal connection board pushing and pressing the first arm and the head section of the cantilever of the main joint to elastically expand the same and pass over the first interference section of the main joint to totally enter the first chamber, the second hook section of the second pivotal connection board pushing and pressing the second arm and the head section of the cantilever of the other main joint to elastically expand the same and pass over the second interference section of the other main joint to totally enter the second chamber of the other main joint, the position where the first and second hook sections totally enter the first and second chambers being defined as a second position of the first and second hook sections.

13. The connection device for a flexible display screen as claimed in claim 9, wherein each subsidiary joint drives a corresponding main joint to relatively move and form a gap between each two adjacent main joints, the first hand section of the subsidiary joint pushing and pressing the first arm and the head section of the cantilever of the main joint to elastically expand the same and pass over the first interference section of the main joint to enter the first chamber, the second hand section pushing and pressing the second arm and the head section of the cantilever of the main joint to elastically expand the same and pass over the second interference section of the other adjacent main joint to enter the second chamber of the other adjacent main joint, the first hook section of the first pivotal connection board pushing and pressing the first arm and the head section of the cantilever of the main joint to elastically expand the same and pass over the first interference section of the main joint to totally enter the first chamber, the second hook section of the second pivotal connection board pushing and pressing the second arm and the head section of the cantilever of the other main joint to elastically expand the same and pass over the second interference section of the other main joint to totally enter the second chamber of the other main joint, the position where the first and second hook sections totally enter the first and second chambers being defined as a second position of the first and second hook sections.

14. The connection device for a flexible display screen as claimed in claim 10, wherein each subsidiary joint drives a corresponding main joint to relatively move and form a gap between each two adjacent main joints, the first hand section of the subsidiary joint pushing and pressing the first arm and the head section of the cantilever of the main joint to elastically expand the same and pass over the first interference section of the main joint to enter the first chamber, the second hand section pushing and pressing the second arm and the head section of the cantilever of the main joint to elastically expand the same and pass over the second interference section of the other adjacent main joint to enter the second chamber of the other adjacent main joint, the first hook section of the first pivotal connection board pushing and pressing the first arm and the head section of the cantilever of the main joint to elastically expand the same and pass over the first interference section of the main joint to totally enter the first chamber, the second hook section of the second pivotal connection board pushing and pressing the second arm and the head section of the cantilever of the other main joint to elastically expand the same and pass over the second interference section of the other main joint to totally enter the second chamber of the other main joint, the position where the first and second hook sections totally enter the first and second chambers being defined as a second position of the first and second hook sections.

\* \* \* \* \*